United States Patent [19]

Nakatsuyama et al.

[11] Patent Number: 4,896,225

[45] Date of Patent: Jan. 23, 1990

[54] TAPE RECORDING AND/OR REPRODUCING APPARATUS

[75] Inventors: Takashi Nakatsuyama, Chiba; Fumihiko Kato, Kanagawa, both of Japan

[73] Assignee: Sony Corporation, Tokyo, Japan

[21] Appl. No.: 236,801

[22] Filed: Aug. 26, 1988

[30] Foreign Application Priority Data

Sep. 14, 1987 [JP] Japan .............................. 62-230276

[51] Int. Cl.$^4$ ....................... G11B 15/46; G11B 15/48
[52] U.S. Cl. .................................................. 360/73.06
[58] Field of Search ..................................... 360/73.06

[56] References Cited

U.S. PATENT DOCUMENTS 3,742,320  6/1973  Ban .................................. 360/73.06
3,834,648  9/1974  Rose et al. ........................ 360/73.06
4,611,252  9/1986  Igata et al. ....................... 360/73.06

Primary Examiner—Robert S. Tupper
Attorney, Agent, or Firm—Lewis H. Eslinger; Donald S. Dowden

[57] ABSTRACT

A tape recorder has an operating mode in which a magnetic tape is run at a speed higher than an ordinary reproducing speed, a magnetic head is in sliding contact with the magnetic tape, and a desired tape position is searched. In this operating mode, the magnetic tape is run initially at a first speed higher than the ordinary reproducing speed, for example triple that speed, for a predetermined period of time after an operating switch that sets the operating mode is turned on. Then, if the operating switch remains continuously turned on after the elapse of this predetermined period of time, the magnetic tape is run at a second speed which is higher than the first speed, for example 16 times the ordinary reproducing speed. In this manner, the tape speed is automatically switched from a high-speed and therefore efficient search mode in which a selected section of the tape is searched to a still higher speed in which the tape is rapidly advanced to a different section of the tape.

11 Claims, 2 Drawing Sheets

CUE MODE

REV MODE

TAPE RECORDING AND/OR REPRODUCING APPARATUS

BACKGROUND OF THE INVENTION

1. Field of the Invention

The present invention relates to a cue/review mode of a tape recorder suitable for use in, e.g., a digital audio tape recorder of the rotary head type.

2. Description of the Prior Art

In a conventional linear tape recorder, the speed in the fast-forward mode (FF mode) is about 50 to 60 times as fast as the speed in the normal playing mode. As compared to this speed, in a conventional rotary head type digital audio tape recorder (sometimes called a DAT), there is the advantage that the speed in the FF mode can be made extremely high (for example, about 200 times as high as in the normal playing mode) because of the helical recording format. However, since the speed in the FF mode is very fast, it is impractical to search a desired position on a magnetic tape while listening to the reproduced sound or observing the wound diameter of the magnetic tape as in a conventional linear tape recorder. To solve this problem, in the DAT, a high speed search operation and a cue/review operation are used to locate a desired target position on the tape.

In the high speed search, rotary heads come into sliding contact with a magnetic tape fed at a high speed (for example, about 200 times as fast as the speed in the normal playing mode) which is near the speed in the fast-forward mode (FF mode) or the rewind mode (REW mode). A start identification (ID) signal recorded on the tape as a sub code is detected. The tape feeding operation is automatically stopped when the start ID signal is detected. The start ID signal is recorded at the beginning of each music program or the like for about nine seconds as measured at the speed employed in the normal playing mode.

The cue/review operation is then used in a fine search of the tape at positions just before and after the tape position located by the high speed search operation or to search a tape position, for example in the middle of a given music program, where no start ID signal is recorded. In the cue/review operation, the magnetic tape is fed at a speed which is about triple the ordinary reproducing speed in the normal playing mode (the latter being, for example, 8.15 mm/sec) and thus much slower than the speed in the FF/REW mode or in the high speed search mode. In the cue/review operation, all of the information of the sub codes and a part of audio pulse code modulated (PCM) signals are reproduced by the rotary heads. Thus the audio PCM signals are reproduced intermittently. The head search operation can be performed while listening to the reproduced sound.

However, a problem arises in the case of making a search without executing the high speed search operation or in the case of searching a desired tape position where no start ID signal is recorded while listening to the sound reproduced in the cue/review operation. Specifically, when the user of the apparatus wants to feed the tape to a position which is located before or after the current tape position by a few minutes, the tape speed, which is only about triple the ordinary reproducing speed, is so slow that it requires an inordinate length of time to complete the search.

OBJECTS AND SUMMARY OF THE INVENTION

It is an object of the present invention to provide a tape recorder that remedies the problems of conventional apparatus noted above.

More particularly, an object of the invention is to provide a tape recorder having an improved cue/review operation in which a tape position which is removed from the current tape position by a few minutes as measured at normal playing speed can be promptly accessed without losing the function that a desired tape position can be searched while listening to the reproduced sound.

According to the present invention, these objects are accomplished by a tape recorder capable of operating at an ordinary reproducing speed and in a forward or reverse direction and comprising: operating mode means for running the magnetic tape at a speed higher than the ordinary reproducing speed in a state in which the magnetic head is in contact with the magnetic tape; operating means controllable by a user of the tape recorder for making the operating mode means operative; first speed control means for controlling the operating mode means so as to run the magnetic tape at a first speed higher than the ordinary reproducing speed; second speed control means for controlling the operating mode means so as to run the magnetic tape at a second speed higher than the first speed; and automatic switching control means responsive to the operating means for making the first speed control means operative for a predetermined period of time after the operating means is operated and for making the second speed control means operative when the operating means is continuously operated after an elapse of the predetermined period of time.

According to the present invention, a magnetic tape is fed at the first speed, e.g. at a speed that is triple the ordinary reproducing speed, for a predetermined period of time, e.g. five seconds after the operation switch is turned on, so that a desired tape position can be searched while listening to the reproduced sound. On the other hand, when the operation switch is continuously turned on after the elapse of a predetermined period of time, the magnetic tape is fed at the second speed, e.g. at a speed that is 16 times as fast as the ordinary reproducing speed, so that the tape can be quickly advanced (in either direction) to a tape position that is displaced from the current position by several minutes as measured at ordinary reproducing speed. Consequently, a desired tape position can be found promptly as compared with conventional apparatus in which a tape position is searched by merely generating the sound.

The foregoing and other objects and features of the present invention will become apparent from the following detailed description and the appended claims with reference to the accompanying drawings.

DESCRIPTION OF THE PREFERRED EMBODIMENT

Figure 1:
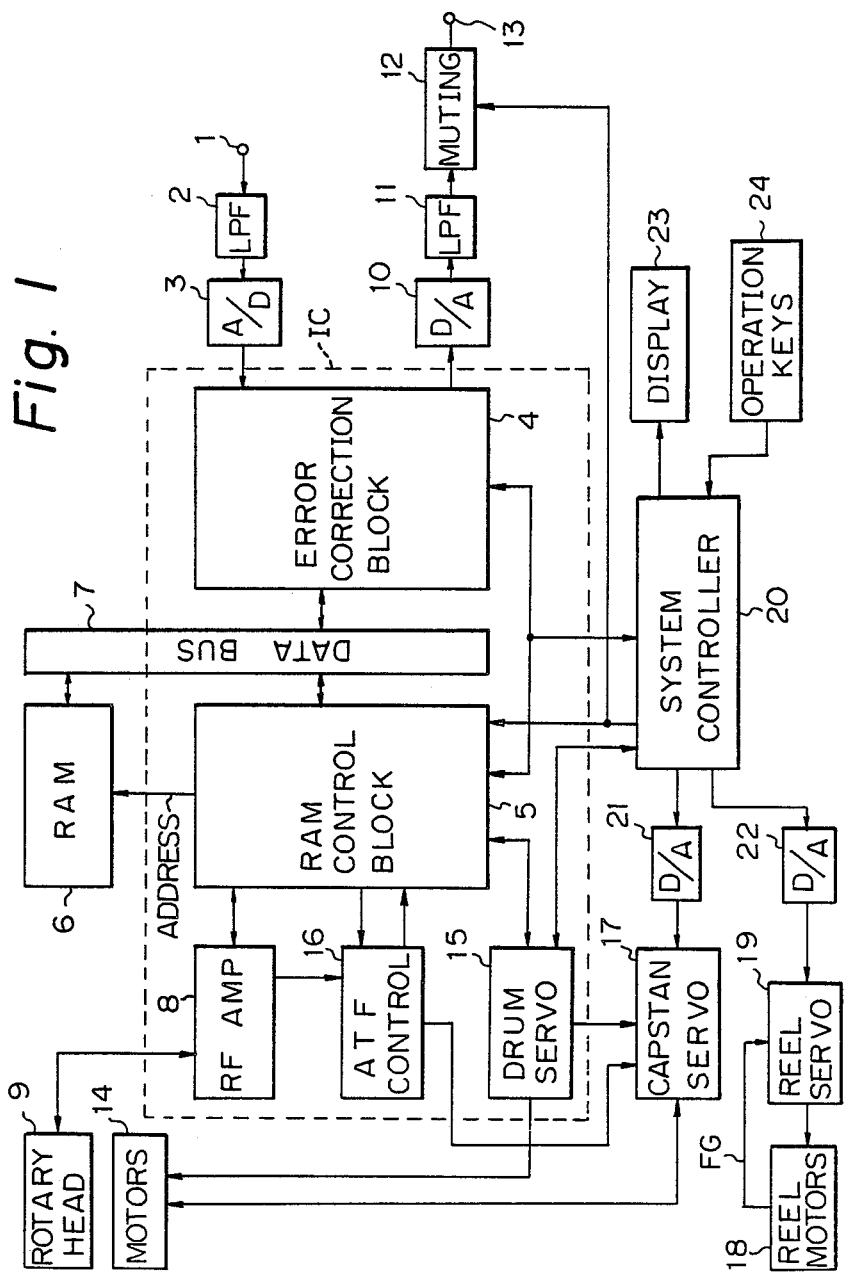
FIG. 1 is a block diagram showing a preferred embodiment of apparatus constructed in accordance with the present invention.

An embodiment of the present invention that is applicable to a DAT is described hereinbelow with reference to the drawings. In FIG. 1, reference numeral 1 denotes an input terminal to which an analog signal is supplied. The analog audio signal received at the terminal 1 is supplied to an analog-to-digital (A/D) converter 3 through a low pass filter (LPF) 2. This signal is converted into a digital audio signal by the A/D converter 3 (employing, for example, 16-bit linear digitization at a sampling frequency of 48.1 kHz or 32 kHz). This digital audio signal is supplied to an error correction block 4.

The error correction block 4 is connected to a random access memory (RAM) control block 5 and a RAM 6 through a data bus 7. In FIG. 1, the portion surrounded by a broken line is constructed as a one-chip integrated circuit IC. The digital audio signal is written into the RAM 6 through the data bus 7 and encoded by the error correction block 4 by use of the Reed-Solomon code. In this error correction encoding process, an address signal is supplied from the RAM control block 5 to the RAM 6. A sub code I/O interface and data modulator/demodulator are provided in the RAM control block 5.

Recording data that is converted into a recording format of the DAT and is (8-10) modulated is generated by the RAM control block 5. This recording data is supplied through a radio frequency (RF) amplifier 8 to rotary heads 9 attached to a drum having a diameter of 30 mm which is rotated at about 2000 r.p.m. A magnetic tape is wound around a rotational peripheral surface of the rotary drum at a wrap angle of about 90°. The recording data is recorded as oblique tracks 41 on the magnetic tape T (FIGS. 3A and 3B) by the rotary heads 9.

The data reproduced from the magnetic tape by the rotary heads 9 is supplied to the RAM control block 5 through the RF amplifier 8 and subjected to a digital demodulating process. The reproduced audio data is written into the RAM 6 and decoded by the error correction block 4 by use of the Reed-Solomon code. The error corrected reproduced data is supplied to a digital-to-analog (D/A) converter 10 and converted into the analog audio signal. The analog audio signal is taken out to an output terminal 13 through a low pass filter 11 and a muting circuit 12.

Reference numeral 14 denotes motors including a drum motor and a capstan motor. A drum servocircuit 15 is provided for controlling the drum motor, and a capstan servocircuit 17 is provided for controlling the capstan motor. An automatic track finding (ATF) pilot signal separated from the reproduced signal is supplied from the RF amplifier 8 to the ATF control circuit 16, by which an ATF control signal is formed. This ATF control signal is supplied to the capstan servocircuit 17.

Reference numeral 18 denotes reel motors that are provided on the tape supply side and the tape take-up side, respectively. The reel motors 18 are controlled by a reel servocircuit 19 so that torques of the supply side reel motor and take-up side reel motor are set to optimum values in accordance with the operating mode. Reference numeral 20 denotes a system controller consisting of, e.g., a microcomputer of four bits. The system controller 20 generates timing signals and control signals for the error correction block 4, RAM control block 5, and drum servocircuit 15 and also generates control data for the capstan servocircuit 17 and reel servocircuit 19. This control data is converted into control voltages by D/A converters 21 and 22, respectively. These control voltages have voltage levels in accordance with the operating mode of the DAT.

The system controller 20 also generates a control signal to mute the generation of the reproduced sound in the cue/review operation at a speed which is about 16 times as fast as the ordinary reproducing speed. This control signal is supplied to the RAM control block 5 in order to mute the digital data and is also supplied to the muting circuit 12 in order to mute the analog audio signal.

In conjunction with the system controller 20, a display unit 23 to display a count value of a tape counter or a reproduction time code and operation keys 24 to designate an operating mode are provided.

Figure 2:
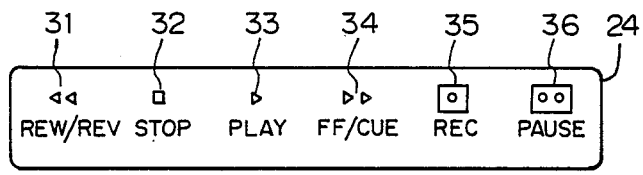
FIG. 2 is a schematic diagram showing an example of operation keys employed in the embodiment shown in FIG. 1.

FIG. 2 shows an example of the operation keys 24. Reference numeral 31 denotes a rewind/review (REW/REV) switch; 32 indicates a STOP switch; 33 is a PLAY switch; 34 a fast-forward/cue (FF/CUE) switch; 35 a recording (REC) switch; and 36 a PAUSE switch.

The operation of the embodiment of the invention disclosed herein will now be described.

When the REW/REV switch 31 or FF/CUE switch 34 is depressed while the tape recorder is in the stop state, the tape recorder executes the rewind or fast-forward operation. On the other hand, when the REW/REV switch 31 or FF/CUE switch 34 is depressed while the tape recorder is in the playing mode, the tape recorder performs the review or cue operation. In the review or cue operation, the magnetic tape is fed at a speed which is about triple the ordinary reproducing speed only for a predetermined period of time, for example about the first five seconds. Then, if REW/REV switch 31 or FF/CUE switch 34 is continuously depressed, the magnetic tape is fed at a speed which is about 16 times as fast as the ordinary reproducing speed after the elapse of the foregoing five seconds.

The switching of the tape speed is automatically performed by control signals which are sent from the system controller 20 to the capstan servocircuit 17 and reel servocircuit 19. For this purpose, a timer circuit is provided in the system controller 20. In the fast-forward and rewind modes, the capstan and its associated pinch roller do not come into contact with the magnetic tape. and the latter is driven only by the respective reel motors. In the cue and review modes, however, the capstan and pinch roller come into contact with opposite sides of the magnetic tape, thereby gripping and driving the magnetic tape.

Figure 3A:
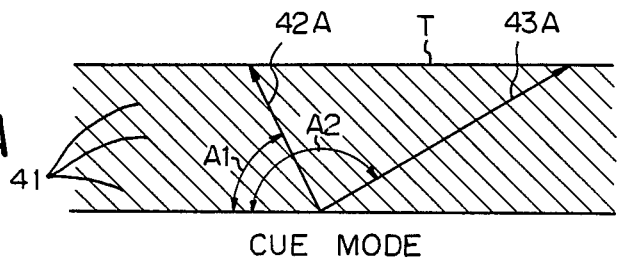
FIGS. 3A and 3B are schematic diagrams for use in explanation of the operation of the embodiment shown in FIG. 1.
Figure 3B:
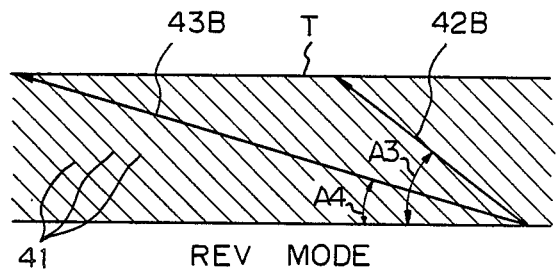

FIG. 3A shows the relation between a pattern of recording tracks 41 on the magnetic tape T in the cue mode and the scan locus of the rotary heads. At a speed which is about triple the ordinary reproducing speed, as shown at 42A in FIG. 3A, a scan locus having an angle of inclination A1 larger than that in the normal playing mode is alternately traced by a pair of rotary heads. At a speed which is about 16 times as fast as the ordinary reproducing speed, as shown at 43A, a scan locus having an inclination angle A2 larger than that formed at the foregoing triple speed is alternately traced by the pair of rotary heads. In the review mode and at a speed which is about triple the ordinary reproducing speed, as shown at 42B in FIG. 3B, a scan locus having an inclination angle A3 smaller than that in the normal playing mode is alternately drawn by the pair of rotary heads. At a speed which is about 16 times as fast as the ordinary reproducing speed, as shown at 43B, a scan locus having an inclination angle A4 smaller than that formed at the foregoing triple speed is alternately drawn by the pair of rotary heads.

In the case of the triple-speed operation in which the scan loci 42A and 42B are drawn, the audio PCM signal is intermittently reproduced from the recording tracks 41. A desired tape position can be searched by listening to the intermittent reproduced sounds obtained from the audio PCM signal. However, in the case of the 16-times speed at which the scan loci 43A and 43B are drawn, the intermittent reproduced sounds of the audio PCM signal can hardly be heard since the speed is too great. Therefore, in the playing mode at the 16-times speed, the output of the reproduced sound is muted by the system controller 20.

However, in the cases of both the triple speed and 16-times speed, all of the information of the sub codes is reproduced by the pair of rotary heads; and, in the case of the 16-times speed, a reproduced time code or a numerical value similar to the time code which is generated by a linear counter and is proportional to the tape run is displayed by the display unit 23. Thus, in contrast to conventional operation in the fast-forward or rewind mode, where the tape speed is exceedingly high and accurate data relating to tape position cannot be reliably obtained, the position of the tape when in accordance with the invention it moves at 16 times the ordinary reproducing speed can be estimated by looking at the data displayed.

Although the preferred embodiment of the invention disclosed above is applied to a DAT, the invention can be applied also to a linear tape recorder in which digital or analog audio signals are recorded in the longitudinal direction of the tape. The invention can be applied also to the case of recording/reproducing an information signal other than audio signals.

The present invention is therefore not limited to the foregoing embodiment, and many modifications and variations are possible within the spirit and scope of the appended claims.

We claim:

1. A tape recorder capable of operating at an ordinary reproducing speed and in a forward or reverse direction and comprising:
    a magnetic head for scanning a magnetic tape;
    operating mode means for running the magnetic tape at a speed higher than said ordinary reproducing speed in a state in which said magnetic head is in contact with the magnetic tape;
    operating means controllable by a user of the tape recorder for making said operating mode means operative;
    first speed control means for controlling the operating mode means so as to run the magnetic tape at a first speed higher than said ordinary reproducing speed;
    second speed control means for controlling the operating mode means so as to run the magnetic tape at a second speed higher than said first speed; and
    automatic switching control means responsive to said operating means for making said first speed control means operative for a predetermined period of time after said operating means is operated and for making said second speed control means operative when the operating means is continuously operated after an elapse of said predetermined period of time.

2. A tape recorder according to claim 1, wherein said automatic switching control means comprises:
    a timer;
    first control means for making said first speed control means operative and for starting said timer in response to the operation of said operating means; and
    second control means for setting said second speed control means in response to said elapse of said predetermined period of time and to the operation of said operating means.

3. A tape recorder according to claim 1, wherein said operating means can be made inoperative while said operating mode means is operating at said first or second speed, and, when said operating means is made inoperative while said operating mode mean is operating at said first or second speed, the operating mode means is made inoperative and the reproducing mode means is set so as to run the magnetic tape at the ordinary reproducing speed in the state in which the magnetic head is in contact with the magnetic tape.

4. A tape recorder according to claim 1, wherein said operating mode means is a cue/review mode means comprising:
    reproducing mode means for running the magnetic tape at the ordinary reproducing speed in the state in which the magnetic head is in contact with the magnetic tape; and
    fast-forward or rewind mode means for running the magnetic tape at a speed higher than said ordinary reproducing speed in a state in which said reproducing mode means is made operative.

5. A tape recorder according to claim 1, wherein said first speed is about triple said ordinary reproducing speed.

6. A tape recorder according to claim 1, wherein said second speed is about 16 times as fast as said ordinary reproducing speed.

7. A tape recorder according to claim 1, wherein said ordinary reproducing speed is about 8.15 mm/sec.

8. A tape recorder according to claim 1, wherein said predetermined period of time is about five seconds.

9. A tape recorder according to claim 1, further comprising a rotary drum, and wherein said magnetic head comprises a plurality of rotary magnetic heads mounted in said rotary drum.

10. A tape recorder according to claim 1, further comprising:
    a reel motor;
    a capstan motor;
    a reversible capstan;
    a pinch roller;
    a supply reel;
    a take-up reel;
    a reel servocircuit responsive to said first speed control means for controlling said reel motor to drive both of or selectively drive either one of said supply reel to supply the magnetic tape and said take-up reel to wind up the magnetic tape; and
    a capstan servocircuit responsive to said second speed control means for controlling said capstan motor to drive said reversible capstan for running the magnetic tape in the forward or reverse direction in cooperation with said pinch roller.

11. A tape recorder according to claim 1, further comprising muting means for reproducing an audio signal recorded on the magnetic tape through said magnetic head and generating a reproduced sound while said operating mode means is operating at the first speed and for stopping the output of said reproduced sound while said operating mode means is operating at the second speed.

* * * * *

UNITED STATES PATENT AND TRADEMARK OFFICE
CERTIFICATE OF CORRECTION

PATENT NO. : 4,896,225

DATED : January 23, 1990

INVENTOR(S) : Takashi Nakatsuyama

It is certified that error appears in the above-identified patent and that said Letters Patent is hereby corrected as shown below:

<u>In the Claims</u>:

Col. 6, line 20, change "mean" to --means--

Signed and Sealed this

Twenty-ninth Day of January, 1991

*Attest:*

HARRY F. MANBECK, JR.

*Attesting Officer*        *Commissioner of Patents and Trademarks*